United States Patent [19]

Sandidge

[11] 4,243,973
[45] Jan. 6, 1981

[54] HOME INTEGRATED SIGNAL SYSTEM

[75] Inventor: David H. Sandidge, Midland, Tex.

[73] Assignee: Gordon B. Arnold, Midland, Tex. ; a part interest

[21] Appl. No.: 24,326

[22] Filed: Mar. 27, 1979

[51] Int. Cl.³ ...................... H04Q 9/16; H04M 11/00
[52] U.S. Cl. .................... 340/148; 179/2 A; 340/371
[58] Field of Search ............... 340/148, 171 R, 168 R, 340/168 B, 371, 326; 179/2 A, 2 R, 175.2 C

[56] References Cited

U.S. PATENT DOCUMENTS

| | | | |
|---|---|---|---|
| 3,613,604 | 10/1971 | Peterson et al. | 340/371 |
| 3,624,646 | 11/1971 | Weiss | 340/371 |
| 3,864,578 | 2/1975 | Lackey | 340/184 |
| 4,016,360 | 4/1977 | Cane | 179/2 A |
| 4,097,690 | 6/1978 | Kuntz et al. | 179/2 A |
| 4,121,053 | 10/1978 | Dick | 179/2 A |
| 4,146,754 | 3/1979 | Rose | 179/2 A |

*Primary Examiner*—Donald J. Yusko
*Attorney, Agent, or Firm*—Clarence A. O'Brien; Harvey B. Jacobson

[57] ABSTRACT

A coordinating unit receives an input signal from the ringing circuit of a telephone, a doorbell switch, the timer of a washing machine, or the like. The coordinating unit, through a program muting circuit reduces the volume of televisions, radios, or the like, in the home and signals of the presence of an input signal by ringing a prescribed chime or chimes associated with the particular input signal. Also, a switching feature is incorporated in order that the power may be removed from certain preselected sockets in the home to eliminate noise from machinery such as power tools or vacuum cleaners. Furthermore, an outdoor signaling device can be operated by the coordinating unit for flashing lights and buzzers mounted exteriorly of the house.

9 Claims, 2 Drawing Figures

HOME INTEGRATED SIGNAL SYSTEM

BACKGROUND OF THE INVENTION

1. Field of the Invention

This invention relates to signaling systems for making the occupant of a building cognizant of the occurrence of one or more events occurring in and about the dwelling.

2. Description of the Prior Art

The prior art abounds with signaling devices for use in a home. U.S. Pat. Nos. 2,717,996 and 2,717,997 issued to Rittenhouse disclose a multiple note chime signal to be used on a dwelling. The chime can be operated in a first mode to indicate the presence of a person at the main entrance of the dwelling and in a second mode to indicate the presence of a person at the rear entrance of the dwelling. U.S. Pat. No. 2,191,247. to Brandon teaches a telephone having both an audible signal and a visual signal. The signals operate simultaneously. U.S. Pat. No. 1,347,421 to Temple shows the combination of a doorbell and an electric light. When the doorbell is rung, the light goes off. U.S. Pat. No. 2,313,560 relates to the ringing of a doorbell or buzzer. When the bell ringing circuit is activated, a lighting circuit is also completed to light a bulb. U.S. Pat. No. 990,972 to Gale sets forth a device to distinguish which of a plurality of adjacent phones is ringing. The ringing phone drops an indicator to distinguish it from the non-ringing phones. U.S. Pat. No. 1,841,773 to Hershey shows a telephone wherein the ringing current of the telephone initiates operation of a chime or a flashing light. U.S. Pat. No. 2,616,972 to McNutt includes a device wherein ringing of the telephone energizes a light operating on a house current. U.S. Pat. No. 2,960,576 to Kath shows an apparatus for completing an electrical circuit to a lamp or other appliance in response to ringing of a telephone. U.S. Pat. No. 3,446,976 to Shaw discloses an apparatus which, upon ringing of a telephone, reduces the volume of an amplifier.

SUMMARY OF THE INVENTION

The system includes a coordinating unit having at least a first input comprising a relay having its coil connected in the ringing circuit of a telephone. A second input constitutes a standard doorbell switch. Auxiliary inputs may be included as desired. The coordinating unit includes a plurality of relays with at least two of the relays comprising an oscillating circuit. The coordinating unit operates a muting circuit which reduces the volume in televisions, radios and the like. It also removes current from a first set of one or more house sockets in order that appliances connected thereto will be shut off to reduce the noise therefrom. The oscillating relays operate a signaling device whereby one or more sockets are periodically connected to and removed from a source of current for flashing lights, buzzers or the like. These lights or buzzers may be attached outside of the dwelling utilizing the system for indicating the presence of a telephone call or a person at the door of the house. Furthermore, the coordinating unit is operative to activate a first chime of a chime unit in response to the ringing of the telephone. A second chime of the chime unit is operated in response to the depression of the doorbell button. The use of auxiliary inputs such as sensors connected to the timer of a dishwasher, a clothes washer, a dryer or the like for activating additional chime units may also be included.

Accordingly, one object of the present invention is to provide a home integrated signal system wherein a single coordinating unit can be utilized for indicating the occurrence of one or more events in or about the dwelling incorporating the system.

A further object of the present invention is to provide a home integrated signal system which reduces the volume level of competing sounds in the dwelling utilizing the system to insure the recognition of the signals produced by the system.

Yet a still further object of the present invention is to provide a home integrated signal system which can selectively disconnect sockets about the dwelling to further reduce competing noise levels.

One even still further object of the present invention is to provide a home integrated signal system which provides pulsed energy to sockets about the dwelling to allow the user of the system to select signaling devices of his own choice to be operated by the system.

Yet another object of the present invention is to provide a home integrated signal system which is inexpensive to manufacture yet is safe and reliable in use.

Another object of the present invention is to provide a home integrated signal system which can easily be adapted to accept auxiliary inputs.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
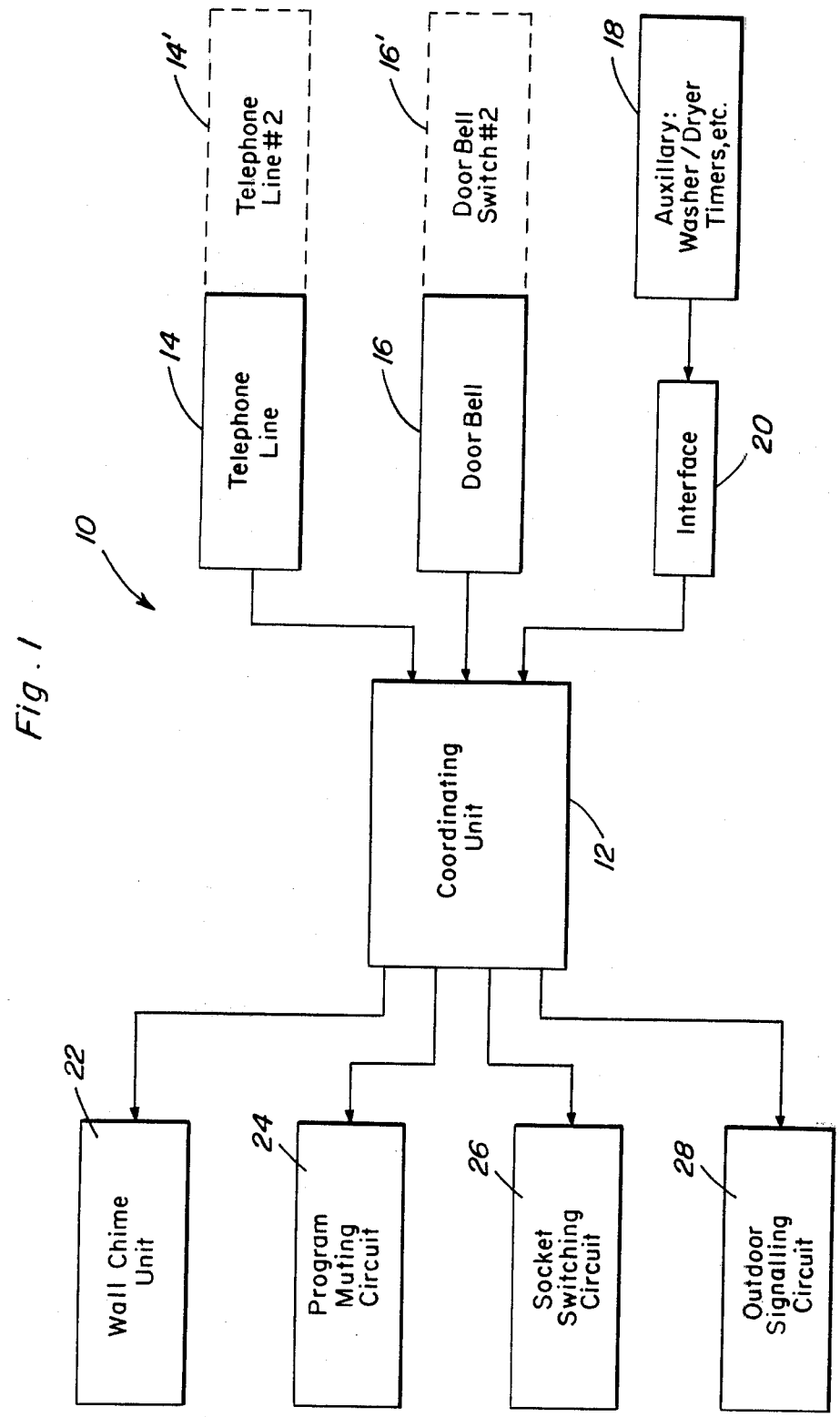
FIG. 1 is a block diagram of the home integrated signal system.

Now with reference to the drawings, the home integrated signal system generally referred to by the numeral 10 will be described in detail. With particular reference to FIG. 1, it can be seen that system 10 includes a coordinating unit 12 which has inputs connected thereto from telephone line circuit 14 which constitutes the ringing circuit of the telephone. Doorbell 16 consists essentially of the standard doorbell depression switch. Additional inputs from telephone lines or doorbell switches can be incorporated in the system as shown at 14' and 16', respectively. Furthermore, auxiliary inputs 18 from, for example, the timers of washers and dryers can be connected to coordinating unit 12 through an appropriate interface 20 as would be apparent to one of ordinary skill in the art. The function of the coordinating unit 12 is to provide an oscillating signal to chime unit 22 in response to signals from inputs 14, 16 or 18. The chime unit 22 is a wall mounted two or three solenoid chime unit which provides central audio signaling of wall telephone lines, door callers, or the like. One or more of these units can be installed to accommodate the total number of inputs to the coordinating unit. In order to reduce the noise level of competing programs and thus insure audibility of the signal emitted from the chime unit, a program muting circuit 24 is incorporated and is responsive to an output signal of the coordinating unit. The program muting circuit functions to operate relays mounted in television or stereo amplifiers to reduce the preamplifier signal level and thereby reduce the volume output of these devices. As a companion unit to the program muting circuit, a socket switching circuit 26 is provided. Socket switching circuit 26 is operative to remove certain preselected sockets from the dwelling's electical circuit. Accordingly, any devices attached to these sockets, as for example, vacuumm cleaners, drills, etc., would be deenergized thus additionally reducing the competing noise level and insuring optimum audibility of the chime unit 22. One addiditional feature of the system is the outdoor signaling circuit 28. Circuit 28 comprises the connection of existing outdoor sockets to the oscillator of coordinating unit 12 in order to flash an outdoor light upon the occurrence of an input signal to the coordinating unit.

Figure 2:
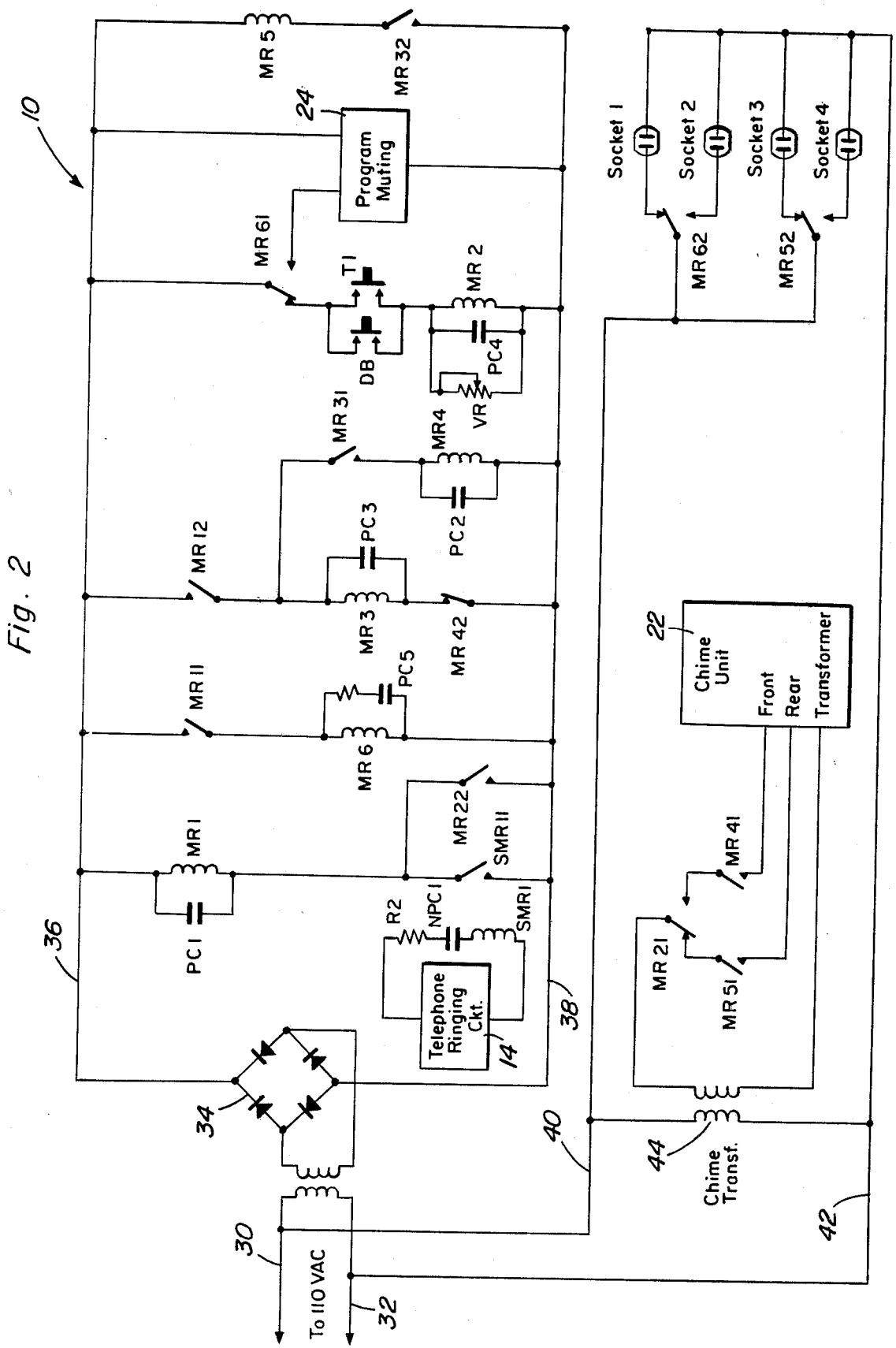
FIG. 2 is a detailed circuit diagram of the home integrated signal system of FIG. 1.

Now with reference to FIG. 2, the specific circuitry for implementing the system shown in FIG. 1 will be set forth. The circuit includes input lines 30 and 32 which are connected to a standard source of 110 volt AC current. Full wave rectifier 34 converts the AC current into DC current which may be filtered if desired. The DC output voltage of bridge 34 is impressed across positive terminal 36 and negative terminal 38. A first relay coil MR1 has one terminal connected to positive line 36. Coil MR1 operates contactors MR11 and MR12, each of which has its stationary contact also connected to positive terminal 36. Connected in parallel with coil MR1 is a first timing capacitor PC1. Coil MR1 is in circuit with the negative terminal 38 through the parallel combination of the normally open contacts of contactor SMR11, operated by relay coil SMR1, and the normally open contacts of contactor MR22, operated by relay coil MR2. Coil MR1 and its associated contactors comprise a first miniature relay which functions as a pulse cycle start relay to energize the oscillator relay combination comprised of coil MR3 and coil MR4, and their associated relay contactors. As is evident, coil MR3 is connected in parallel wtih its timing capacitor PC3 and in the series with normally closed contacts MR42, which are operated by coil MR4. This combination is in parallel with the series combination of the normally open contacts of MR31, and coil MR4, which is in parallel with its timing capacitor PC2. This total parallel combination is in series with the normally open contacts of MR12. Accordingly, it will be evident that upon actuation of relay MR1, the contacts of MR12 are closed thus energizing coil MR3. Coil MR3 closes the contacts of MR31 which energize relay MR4. This then opens the contacts of MR42 to deenergize coil MR3 after capacitor PC3 is discharged. This effects the opening of the contacts of MR31 to deenergize coil MR4 in a similar manner. This oscillation is continued until the contacts of MR12 are again opened. Furthermore, relay MR1 closes the contacts of MR11 which energizes relay coil MR6, the activation of which is controlled by the parallel combination of timing capacitor PC5 and resistor R1.

Contactor MR61 has its movable contact connected to the positive line 36 and, in its normally closed position, provides current to the parallel switch combination of momentary actuation test switch T1 and doorbell switch DB. This parallel switch combination is in series with coil MR2 which is in parallel with timing capacitor PT4 and variable resistor VR. Relay MR2 functions as the doorbell trigger to energize start relay MR1. In its normally open position, contactor MR61 initiates operation of program muting circuit 24, the operation of which was described hereinabove.

Finally, one side of coil MR5 is connected to positive line 36 while the opposite side thereof is connected through the normally open contacts of contactor 32 to negative line 38.

Connected to input lines 30 and 32 respectively are AC power lines 40 and 42. Lines 40 and 42 provide power to the chime unit 22 through chime transformer 44. As discussed above, chime unit 22 contains multiple chimes which are individually actuatable. By providing current to the input labelled "FRONT" one of said chimes is actuated while providing current to the input labelled "REAR" the other of said chimes is actuated, while a common line for the chimes is connected to the input marked "TRANSFORMER". The output of chime transformer 44 has one terminal connected to the movable contact of contactor MR21. In its normally closed position, contactor MR21 provides current to normally open contactor MR51 which is in turn connected to the "REAR" input of chime unit 22. In its normally open position, contactor MR21 provides current to the "FRONT" input of chime unit 22 through the normally open contacts of MR41.

AC lines 40 and 42 are also connected to sockets 1–4 with AC line 42 being connected to the common terminal of each of the sockets. Line 40 is connected to the movable contact of each of contactors MR52 and MR62. In its normally closed position, contactor MR52 is connected to socket 3 while in its normally open position contactor MR52 provides current to socket 4. In like manner, contactor MR62 provides current to socket 1 in its normally closed position and provides current to socket 2 in its normally open position.

A sub-miniature relay SMR1 is connected in series with the telephone ringing circuit 14. Also in this series circuit is filter capacitor NPC1 and resistor R2. These elements function to filter the current developed by the telephone ringing circuit to actuate relay SMR1.

In operation, when the relay SMR1 is activated in response to the ringing of a telephone, contactor SMR11 closes its normally open contacts thereby activating coil MR1. Relay coil MR1 closes the normally open contacts of MR11 and MR12. The contacts of MR12 operate to start the oscillating cycle of coils MR3 and MR4 as discussed hereinabove. The contacts of MR11 serve to actuate coil MR6 which moves contactor MR61 to its normally open position thus initiating operation of a program muting circuit 24 to reduce the level of any radios, televisions or the like, operating within the confines of the dwelling. In like manner, contactor MR62 is moved to its normally open position thus removing energization from socket 1 and thereby deenergizing any appliance connected thereto. This also reduces the noise level within the dwelling. By connecting line 40 to socket 2, energization of any device attached thereto is initiated. Socket 2 can be used for providing a continuous indication of the presence of a input signal to the system.

Relay coil MR3, in addition to actuating contactor MR31, which functions in the oscillating circuit, causes periodic closings of contactor MR32 which causes periodic activation of coil MR5. coil MR5 is operative to close the normally open contacts of contactor MR51 and thus provide a pulsed input to the "REAR" input of chime unit 22. This then produces an audible indication of the presence of an incoming telephone call. In like manner, contactor MR52 is pulsingly displaced between its normally closed and normally open positions, thereby providing pulsed current to sockets 3 and 4. Socket 3 could be, for instance, an outdoor socket utilized for deenergizing a lamp used for lighting the backyard. By periodic activation of MR52, the lamp would be pulsingly actuated thus giving an indication of the presence of an input signal to the system. Socket 4 could be a special purpose socket used for energizing a second audible or visual signal in a pulsed manner upon the presence of an input signal to the system.

In response to the momentary depression of either test button T1 or doorbell DB, coil MR2 is actuated. The duration of actuation of the coil MR2 is determined by the setting of variable resistor VR and the value of timing capacitor PC4. Coil MR2 is held on for a reasonable length of time. Coil MR2 closes the normally open contacts of contactor MR22 which in turn actuates coil MR1. Coil MR1 operates in a like manner to its operation in response to the closing contactor SMR11 to cause operation of the oscillator circuit comprising coils MR3 and MR4, the initiation of operation of the program muting circuit 24, a transfer of energization from socket 1 to socket 2 and a transfer of pulsed energization from socket 3 to socket 4. In addition, coil MR2 moves contactor MR21 to its normally open position whereat current is supplied to contactor MR41. MR41 is periodically closed through operation of relay MR4. Contactor MR4 thereby causes pulsed operation of the front input of chime unit 22.

As can be easily understood from the diagram of FIG. 2, additional inputs could easily be supplied to the circuit by merely placing additional open contacts in parallel with SMR11 and MR22 and providing additional chime units such as shown at 22. In this manner, the end of a cycle of a home washing machine could be easily signalled to the user thereof as well as the end of a cycle of a dryer, dishwasher or other home appliance. In this manner, the system allows total freedom of movement in or around the home by insuring the user of the system that all signals inputed will produce audible and/or visual indications around the home.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A system for producing an audible output upon the occurrence of certain events, comprising:
   first input means for providing a first input signal upon the occurrence of a first event;
   second input means for providing a second input signal upon the occurrence of a second event;
   coordinating circuit means connected to said first input means and said second input means for receiving said first and second input signals and producing first and second control signals respectively in response thereto;
   a first output means controlled by said coordinating circuit means for providing an audible signal in respone to one of said control signals;
   a second output means which is switched between a first, energized state and a second, deenergized state in response to one of said control signals;
   a third output means comprising a muting circuit for reducing the volume of competing sounds in response to one of said control signals; and
   a fourth output means comprising at least one normally energized electrical socket and further wherein said coordinating circuit means includes an oscillator circuit means for periodically interrupting the electrical supply to said socket for producing periodic energization of any load device connected to said socket.

2. The system of claim 1 wherein said first output means comprises a chime unit and further wherein said oscillator circuit means is connected to said chime unit for producing periodic energization thereof.

3. The system of claim 1 wherein said first output means comprises a first audible signalling device which is actuated by said coordinating circuit means in response to said first input signal, and a second audible signalling device which is activated by said coordinating circuit means in response to said second input signal.

4. The system of claim 3 wherein said first input means is connected in a telephone ringing circuit for producing an input signal to said coordinating means upon the ringing of a telephone.

5. The system of claim 4 wherein said second input means is in a circuit with a doorbell pushbutton for providing said second input signal to said coordinating circuit means in response to the actuation of said doorbell button.

6. The system of claim 1 wherein said third output means comprises at least one normally energized electrical socket which is deenergized in response to a control signal from said coordinating means for deenergizing any load connected thereto and thereby eliminating any noise being produced by said load.

7. A system for the production of an audible output upon the occurrence of certain events, comprising:
   first input means for providing a first input signal upon the occurrence of a first event;
   second input means for providing a second input signal upon the occurrence of a second event;
   coordinating means connected to said firt input means and said second input means for receiving said first and second input signals and producing first and second control signals respectively in response thereto;
   first output means controlled by said coordinating means for providing an audible signal in response to one of said control signals;
   a second output means which is switched between a first energized state and a second deenergized state in response to one of said control signals; and
   a third output means comprising an electrical socket and further including oscillator circuit means disposed in said coordinating circuit for supplying pulsating electrical energy to said socket for producing periodic energization of any device connected to said socket.

8. The system as defined in claim 1 and further including a muting output means comprising a muting circuit for reducing the volume of competing sounds in response to one of said control signals.

9. The system as defined in claim 1 wherein said first input means is connected in a telephone ringing circuit for producing an input to said coordinating means upon the ringing of a telephone.

* * * * *